United States Patent [19]

Rohde et al.

[11] Patent Number: 5,082,373
[45] Date of Patent: Jan. 21, 1992

[54] APPARATUS FOR SELECTING, CAPTURING AND PROBING FOOD PRODUCTS

[75] Inventors: Larry A. Rohde, Mississauga; Mark R. Hall, Lorretto; Edward Kroeger, Toronto; Joyce E. Sutherland, Brampton, all of Canada

[73] Assignee: Canada Packers Inc., Canada

[21] Appl. No.: 588,721

[22] Filed: Sep. 27, 1990

[51] Int. Cl.⁵ .................... G01K 1/14; B25J 11/00
[52] U.S. Cl. .................... 374/155; 73/863.91; 452/177; 901/41
[58] Field of Search ........... 374/141, 155, 208, 210; 294/907, 115; 901/31, 36, 27, 46, 33, 41; 73/863.85, 863.91, 863.92; 452/177; 99/421 R, 421 TP, 334; 414/753, 115

[56] References Cited

U.S. PATENT DOCUMENTS

| | | | |
|---|---|---|---|
| 3,370,213 | 2/1968 | Rose | 294/115 X |
| 3,904,234 | 9/1975 | Hill et al. | 901/38 |
| 4,062,455 | 12/1977 | Flatan | 901/36 |
| 4,219,370 | 8/1980 | Hoaglin et al. | 901/46 |
| 4,254,433 | 3/1981 | Dewar et al. | 901/46 |
| 4,273,506 | 6/1981 | Thomson et al. | 901/31 |
| 4,293,268 | 10/1981 | Mink | 901/31 |
| 4,473,249 | 9/1984 | Valentine et al. | 414/753 X |
| 4,580,909 | 4/1986 | McIntosh | 374/155 |
| 4,766,844 | 8/1988 | Brewer et al. | 901/31 |
| 4,813,732 | 3/1989 | Klem | 294/907 |
| 4,906,926 | 3/1990 | Rogacki et al. | 294/907 |
| 4,941,182 | 7/1990 | Patel | 901/43 |

Primary Examiner—Daniel M. Yasich
Attorney, Agent, or Firm—Bacon & Thomas

[57] ABSTRACT

An automated apparatus for gripping and probing food products is provided, so as to test the products while they are moving on a conveyor. The apparatus has a pair of jaws, which move forward and close when the food product is detected in the appropriate position, so as to grip the product between the faces of the jaws. While so gripped, a probe moves forward to penetrate and test the product, e.g. for temperature, pH, conductivity etc. Then the sequence of operations is reversed, withdrawing the probe, releasing and withdrawing the jaws, so that the product can move on and the apparatus is positioned to grip and test the next food item moving down the conveyor. The apparatus is particularly well suited for testing suspended meat products.

14 Claims, 4 Drawing Sheets

APPARATUS FOR SELECTING, CAPTURING AND PROBING FOOD PRODUCTS

FIELD OF THE INVENTION

This invention relates to food handling apparatus, and more particularly to apparatus for handling and testing large food items as they move along a continuous conveyor system.

BACKGROUND OF THE INVENTION AND PRIOR ART

Food items such as large cuts of meat, sides of beef, hams, bacon bellies, cheeses, cans of food in a canning operation and the like are commonly processed at the manufacturing plant on a continuous conveyor system, with the items being continuously conveyed between treatment and operating stations. It is often necessary to conduct tests on such items during treatment to determine that the particular treatment is being successfully conducted. This may entail penetration of the items with a probe, an operation not easily accomplished on a moving, suspended solid item.

For example, it is common to cook bacon bellies in this manner, by moving them continuously through a cooking oven whilst freely suspended from a continuously moving overhead conveyor. While in the oven, it is desirable to test the internal temperature of the bacon belly with a probe, to ensure that suitable cooking is being accomplished. It is common current practice to conduct this temperature testing manually, with an operator inserting a temperature probe into sample bacon bellies after they emerge from the oven. Such labour intensive operations are undesirable. In addition, manual handling of meat products during preparation should be minimized, for sanitary reasons, and for operator safety considerations. Temperature testing during passage through the oven, as well as after emergence from the oven, is preferable to temperature testing after emergence from the oven alone.

It is an object of the present invention to provide a novel automated holding and probing apparatus for food products, which reduces these disadvantages and drawbacks.

SUMMARY OF THE INVENTION

The present invention provides an automated capturing, holding and probing apparatus which can be mounted in a fixed position alongside a conveying path of food products. It is provided with jaws and a probe which automatically move forward to grip and probe into the product, e.g. to measure its temperature, and then move backward to release the product, in a predetermined sequence of movements, without interrupting the continuous movement of the conveyor.

Thus, according to the present invention, there is provided an apparatus for capturing, holding and probing penetrable food products, said apparatus comprising:

a gripper comprising jaws moveable between a protruded position and a retracted position, and moveable relative to each other to vary their mutual separation;

first gripper actuating means adapted to move the jaws between their protruded position and their retracted position;

second gripper actuating means adapted to move the jaws towards and away from one another;

a probe adapted to penetrate a food product gripped between the jaws, the probe being moveable between a protruded position and a retracted position;

probe operating means adapted to move the probe between its protruded position and its retracted position.

BRIEF REFERENCE TO THE DRAWINGS

In the drawings, like reference numerals indicate like parts.

DESCRIPTION OF THE PREFERRED EMBODIMENTS

Preferably, the probe of the apparatus of the present invention is a temperature sensing probe, having a pointed distal end for easy penetration of the food product. However, the invention encompasses the use of other parameter-sensing probes also, as commonly used in the food processing industry. The probe is suitably disposed for movement between its protruded position and its retracted position between the jaws of the gripper, so that it penetrates the food product at the point of firmest holding thereof by the jaws.

Preferably also, the probe is disposed to move along the centre line between the two jaws. This ensures that it penetrates into the centre portion of the food product, when the jaws are gripping the sides of the food product, to take a parameter reading from the centre of the thickness of the product rather than the edge portion thereof.

In the preferred embodiment of the invention, the gripper actuating means and the probe operating means are suitably hydraulically or pneumatically operated, e.g by cylinders and piston rods protruding therefrom, mounted on an appropriate framework adjacent to the jaws in the probe.

The preferred apparatus of the invention also includes a trigger means for automatically initiating the pre-determined sequence of movements of the jaws and the probe. Suitably this trigger means comprises a photocell adapted to detect the presence of a food product in a position for gripping between the jaws. The photocell is thus appropriately mounted in substantial alignment with the probe, facing in the direction of forward movement of the probe.

The apparatus of the present invention finds its most convenient utilization in association with the testing of suspended meat products, e.g. bacon bellies, as they move through a cooking oven freely suspended from an overhead monorail conveyor. In such an embodiment, the apparatus can be mounted in a stationary position alongside the conveying path, and can capture and test the product, and then release it, without interrupting the continuous movement of the conveyor. In other adaptations, however, the apparatus can be mounted on tracks alongside the conveyor, or on the conveyor itself, to move with the conveyor on which the food product is being conveyed. When the capturing and testing operation of an individual food product has been concluded, the apparatus can then move relative to the conveyor, to return to its starting position. Such an arrangement allows the apparatus to be used with food products supported on the surface of a moving conveyor.

DETAILED DESCRIPTION OF THE SPECIFIC, MOST PREFERRED EMBODIMENT

Figure 1:
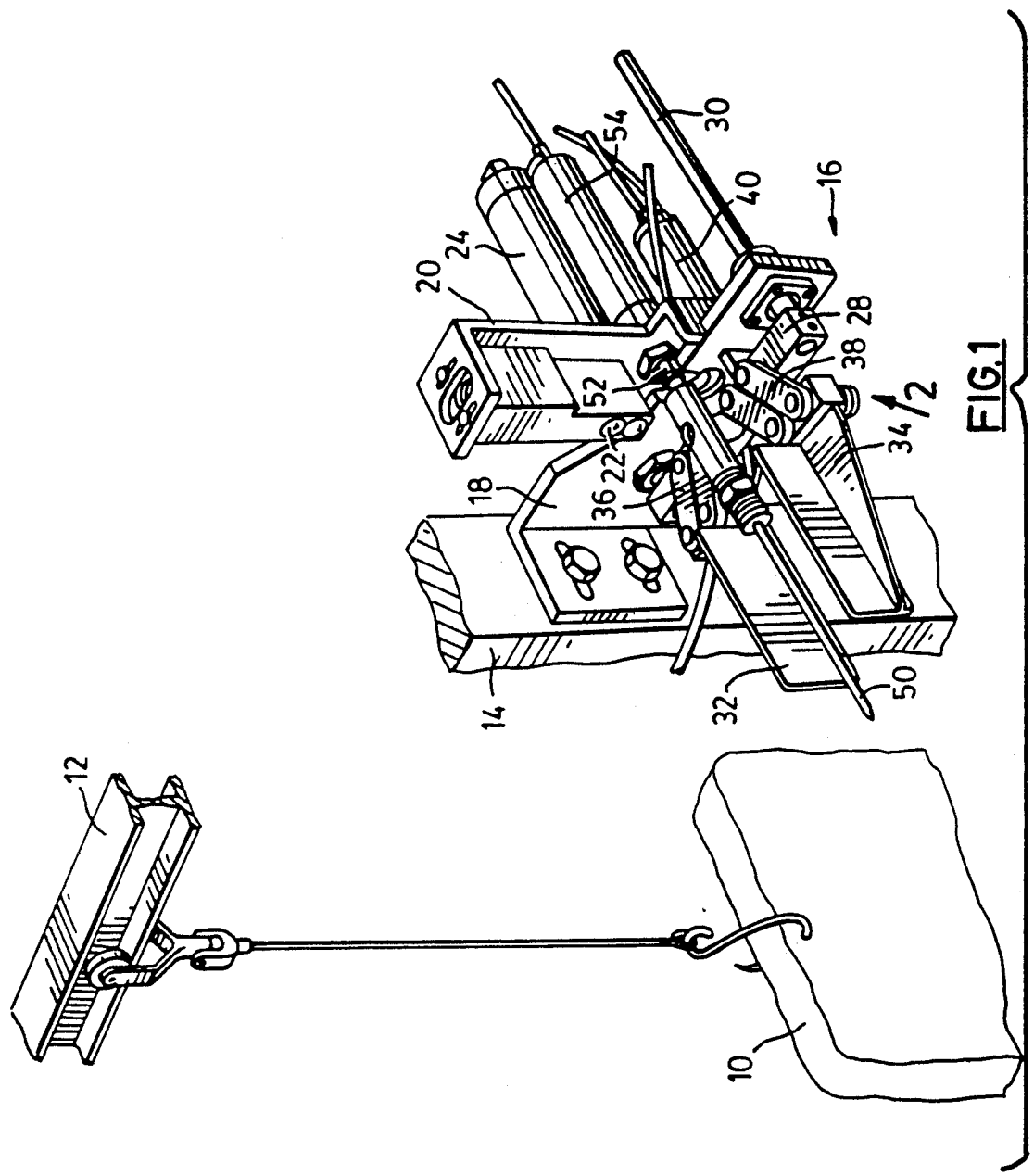
FIG. 1 is a general perspective diagrammatic view of an apparatus according to a specific preferred embodiment of the invention, mounted adjacent a meat conveyor ready for operation.
Figure 2:
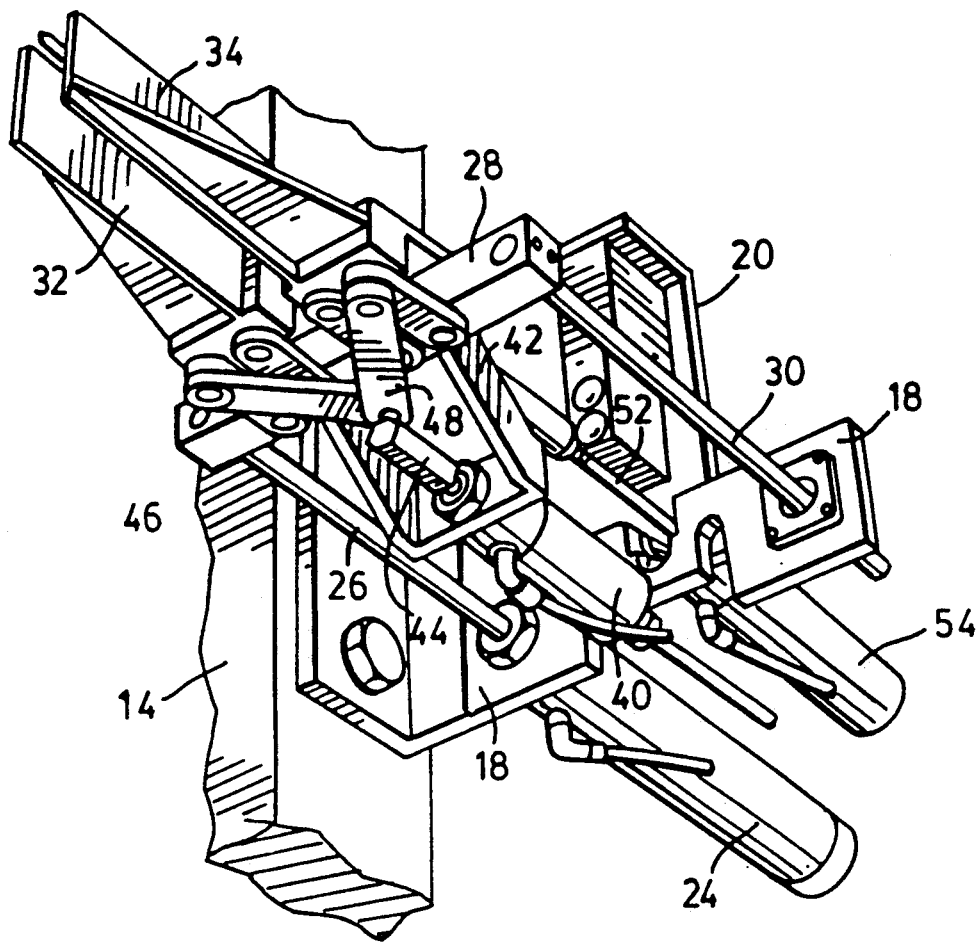
FIG. 2 is an underneath perspective view of the apparatus of FIG. 1, viewed in the direction of arrow 2 on FIG. 1.

With reference to FIGS. 1 and 2 of the accompanying drawings, a bacon belly 10 is freely suspended from a monorail conveyor 12 along which it moves continuously but slowly after exit from a cooking oven (not shown). Positioned adjacent to the path of travel of the belly 10 and mounted on a fixed upright 14 is the holding and probing apparatus of the embodiment of the invention, generally indicated by numeral 16. This apparatus comprises a transversely disposed angle bracket 18, adjustably bolted to the upright 14, and an upright 20 fixedly secured to and extending upwardly from the angle bracket 18 near the lateral midpoint thereof. The upright 20 carries a forwardly facing photocell 22.

A first gripper actuating means in the form of a first pneumatic cylinder 24 is mounted horizontally on the rear face of angle bracket 18. A reciprocable piston rod 26 (FIG. 2) from cylinder 24 extends forwardly through an aperture in one side of bracket 18, and carries, on its forward end, a base unit in the form of an elongated square sectioned bar 28, near one lateral end thereof. The other lateral end of bar 28 is carried by the end of guide rod 30 extending through another aperture at the other side of bracket 18. Bar 28 is moveable backwards and forwards with respect to bracket 18, in response to backwards and forwards movement of piston rod 26 caused by actuation of first pneumatic cylinder 24.

A pair of jaws 32, 34 with inwardly facing smooth planar surfaces are disposed forwardly of bar 28 and are linked thereto by means of pairs of link arms 36, 38 respectively. These link arms are generally horizontally disposed, and pivotally connected at one end about a vertical axis to the rear end of the respective jaws 32 or 34, and pivotally connected at the other end about a vertical axis to the bar 28.

A second gripper actuating means in the form of a second pneumatic cylinder 40 is disposed below and protruding through a cut-away formation in the bottom edge of angle bracket 18, and is secured at its front end to a U-bracket 42 (FIG. 2) attached to the bar 28. The piston rod 44 of second cylinder 40 is pivotally attached at its forward end to a pair of linkages 46, 48 which protrude forwardly at an angle to the rod 44 to be pivotally connected to respective link arms 36, 38 at their axis of pivotal connection to the rear end of respective jaws 32, 34. Thus, forward movement of piston rod 44 relative to bar 28 causes mutual separation of jaws 32, 34 and rearward movement of piston rod 44 causes closure of jaws 32, 34.

Figure 7:
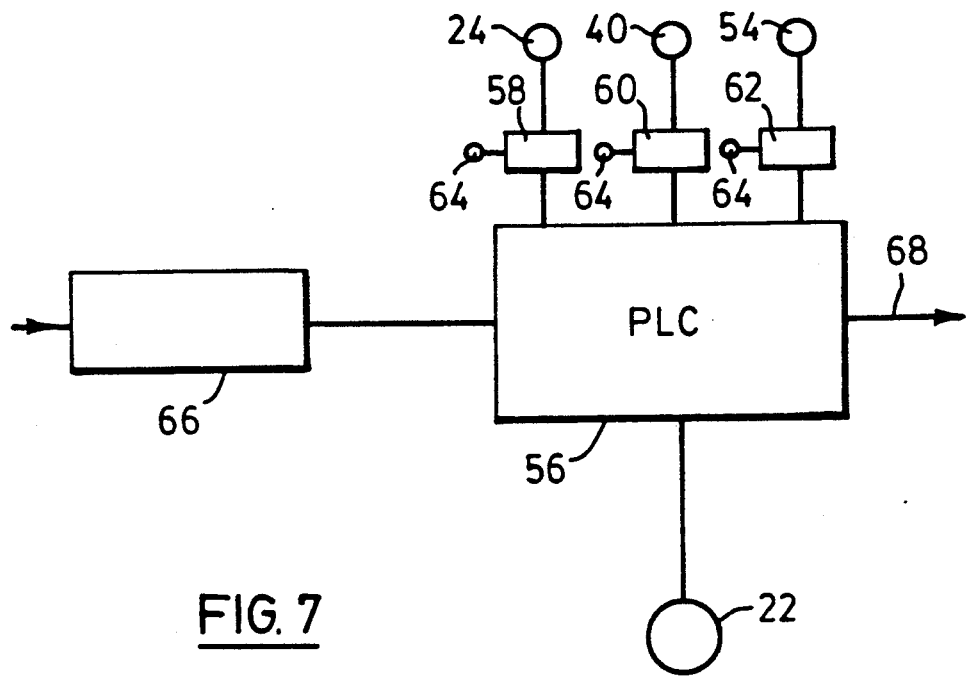
FIG. 7 is a diagrammatic representation of the control means of the illustrated apparatus.

Between the jaws 32, 34 is provided a forwardly projecting pointed temperature probe 50, mounted on the end of a piston rod 52 actuated by a probe operating means in the form of a third pneumatic cylinder 54. The forward end of pneumatic cylinder 54 is secured to the rear face of angle bracket 18. The probe 50 is in substantial vertical alignment with the photocell 22. All the pneumatic cylinders 24, 40, 54 are connected by suitable solenoid actuated spring return directional control valves 58, 60, 62 respectively, diagrammatically shown in FIG. 7, to a source of pneumatic power 64. The valves are controlled for sequential operation of the pneumatic cylinders in response to signals received from the photocell 22 and appropriately arranged electronic timing means through a programmable logic controller (PLC) 56 (FIG. 7) constructed and operated according to standard features of art.

The operation of the illustrated apparatus will now be described with specific reference to FIGS. 3, 4, 5, 6 and 7.

Figure 3:
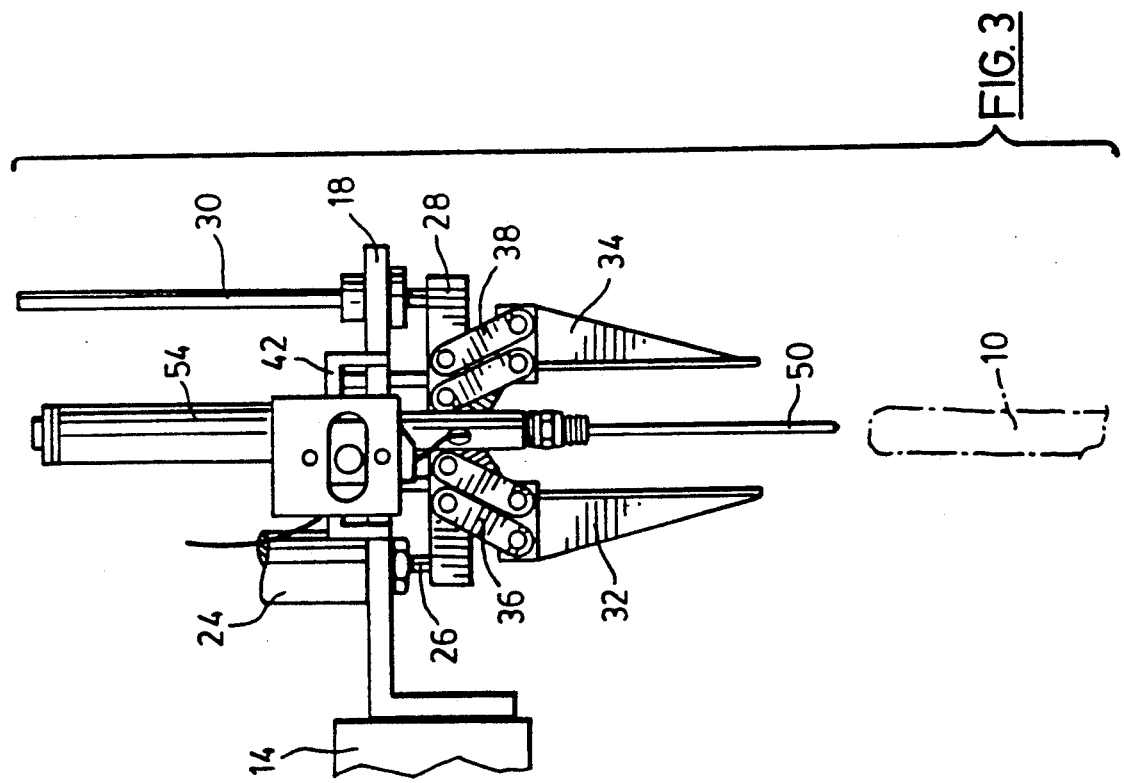
FIG. 3 is a top view of the apparatus of FIGS. 1 and 2 in a first position, with the jaws in a separated retracted position and the probe in a retracted position.
Figure 6:
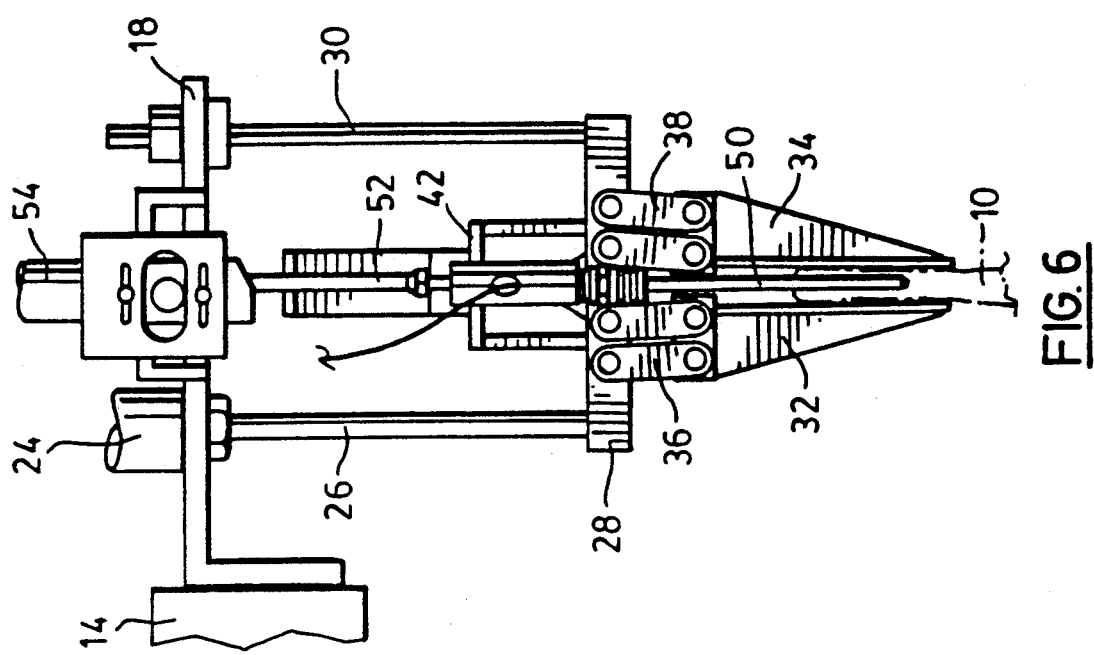
FIG. 6 is a view as in FIGS. 3, 4 and 5 but with the jaws in a gripping, protruded position and the probe in a protruded position.
Figure 5:
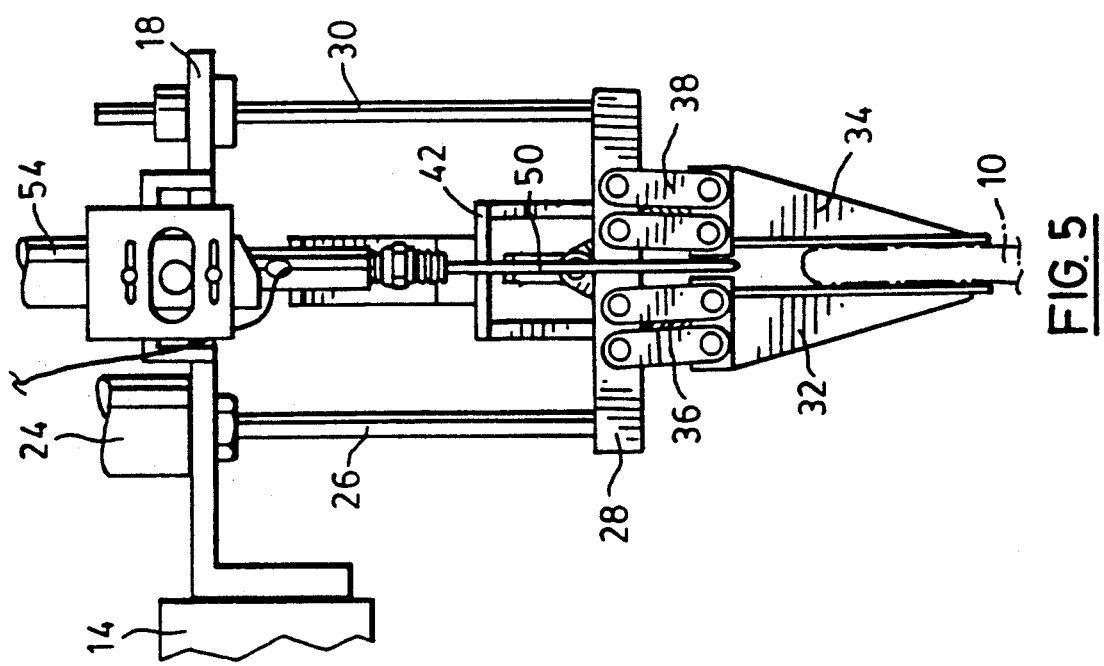
FIG. 5 is a view as in FIGS. 3 and 4 but with the jaws in a gripping, protruded position.

A bacon belly 10 moves from its cooking oven along conveyor 12 with the holding and probing apparatus of the embodiment in the position shown in FIG. 3, i.e. with jaws 32, 34 separated and retracted and with probe 50 retracted. When the photocell 22 detects the presence of the side of the belly 10 in line therewith, it sends the appropriate signal to PLC 56 to initiate the sequence of operation through the pre-set timer circuitry of PLC 56. Firstly it causes valve 58 to open for a predetermined time, thereby actuating first pneumatic cylinder 24 to push piston rod 26 forwardly. This moves jaws 32, 34 and bar 28 to a forwardly protruding position so that the belly 10 is disposed between the jaws 32, 34. The separation of jaws 32, 34 and the angular orientation of link arms 36, 38 and linkages 46, 48 does not change during this movement. Now the apparatus has assumed the position shown in FIG. 4. The lapse time for the of extension of piston rod 26 is controlled by the PLC. At the end of the lapse time, the PLC actuates the next operational step.

Figure 4:
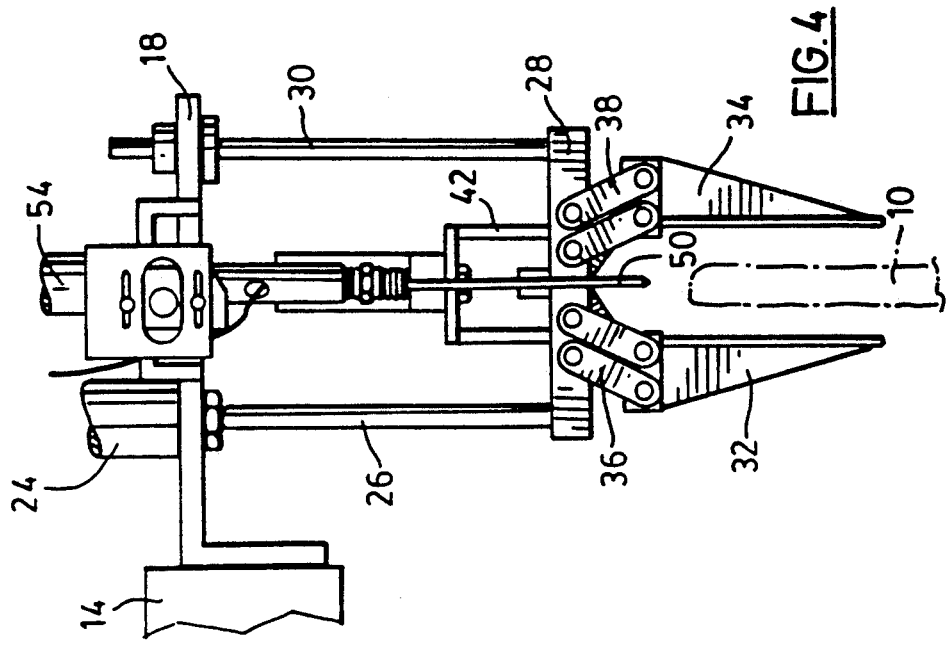
FIG. 4 is a view as in FIG. 3 but with the jaws in a separated, protruded position.

Next, with the apparatus disposed as in FIG. 4, the timing circuitry of PLC 56 causes valve 60 to open so that second pneumatic cylinder 40 is actuated to move its piston rod 44 forwardly relative to bar 28. This causes pivotal movement of the linkages 46, 48 and link arms 36, 38 to cause jaws 32, 34 to close and firmly grip the sides of the bacon belly 10 between their smooth inner surfaces. This is the position shown in FIG. 5.

Then the timing circuitry of PLC causes valve 62 to open so that the third pneumatic cylinder 54 is actuated and its piston rod 52 moves forward to insert probe 50 into the bacon belly 10 while the latter is firmly gripped by the jaws 32, 34. This is the position shown in FIG. 6. The temperature of the interior of the bacon belly 10 is thus read, to determine correct cooking and curing thereof, and if necessary to allow adjustment of the cooking conditions. Resistance changes so obtained are fed to a temperature converter 66, of standard form, and then to the PLC 56. An output 68 from the PLC 56 feeds the temperature readings to a recorder, display or automatic feedback for oven adjustment. The sequence of operation is then reversed, under control of the PLC, with the probe 50 being withdrawn to return the apparatus to the FIG. 5 position. Then the jaws 32, 34 are separated to release the grip on the bacon belly 10, returning the apparatus to the FIG. 4 position. Then the jaws 32, 34 are retracted to the FIG. 3 position, allowing the bacon belly 10 to move on with conveyor 12 and position the apparatus to repeat the operational cycle on the next bacon belly coming down the conveyor 10, when it is sensed as appropriately positioned by photocell 22.

The entire sequence of operations as described typically takes no more than 20 seconds. The conveyor 12 is relatively slow moving, so that it does not need to be stopped while the sequence of operation takes place. The flexible suspension of the belly 10 from the conveyor 12 allows for the operation to be conducted by a gripper and probe apparatus mounted in a fixed position alongside a moving conveyor.

This illustrated embodiment operates in conjunction with meat products freely suspended from a conveyor. However, with minor modifications it can be arranged for use with supported conveyed products also. If the apparatus is mounted in a fixed location relative to the conveyor, it may cause temporary halting of the movement of the product with the conveyor. Alternatively, it can be mounted to move with the conveyor, e.g. on the conveyor itself or on tracks alongside the conveyor, as it performs its capturing and probing functions, with automatic return to its starting position when the probe operation is completed.

Whilst a specific preferred embodiment of the invention has been described and illustrated in detail herein, the invention is not to be construed as limited thereto. The scope of the invention is defined by the appended claims reasonably construed.

What is claimed is:

1. Apparatus for capturing, holding and probing a penetrable food product, said apparatus comprising:
   a gripper comprising jaws movable in a first direction between a protruded position adjacent a food product to be captured from a conveying means and a retracted position remote from said food product, said jaws also being moveable relative to each other to vary their mutual separation to capture and release said food product when said jaws are in said protruded position;
   first gripper actuating means adapted to move the jaws between their protruded position and their retracted position;
   second gripper actuating means operable to move the jaws towards and away from one another when said jaws are in said protruded position;
   a probe moveable by means independently of said jaws when said jaws are in said protruded position in said first direction between a protruded position to penetrate a food product for sensing temperatures of said food product held between the jaws and a retracted position spaced from said food product; and
   probe operating means operable to move the probe between its protruded and its retracted position when the jaws are in said protruded position.

2. Apparatus according to claim 1 wherein said probe is disposed for movement between its protruded position and its retracted position between the jaws.

3. Apparatus according to claim 2 wherein the probe is disposed for movement between its protruded position and its retracted position along the centre line between the jaws.

4. Apparatus according to claim 2 wherein the first gripper actuating means, the second gripper actuating means and the probe operating means are pneumatically or hydraulically operated.

5. Apparatus according to claim 4 wherein the first gripper actuating means, the second gripper actuating means and the probe operating means are mutually interconnected to provide a predetermined sequence of movements of the jaws and the probe.

6. Apparatus according to claim 5 further including a trigger means for automatically initiating the predetermined sequence of movements of the jaws and the probe.

7. Apparatus according to claim 6 wherein said trigger means comprises a photocell adapted to detect the presence of a food product in a position for gripping between the jaws.

8. Apparatus according to claim 7 wherein said jaws have mutually opposed smooth gripping surfaces.

9. Apparatus according to claim 8 wherein said probe is a temperature sensing probe.

10. Apparatus according to claim 7 wherein said jaws are pivotally mounted on a base unit by means of pivoted link arms, the link arms being pivotable with respect to the base unit in response to the operation of the second gripper actuating means to move the jaws towards and away from one another.

11. Apparatus according to claim 10 wherein said base unit is moveable forwardly and rearwardly in response to the operation of the first gripper actuating means, to move the jaws between their protruded position and their retracted position.

12. A system for moving and testing penetrable food products, said system comprising:
   a conveyor including support means for supporting said penetrable food products and drive means to move continuously said support means along a path;
   an apparatus disposed along said path for capturing, holding and probing said penetrable food products as said food products are moved along said path by said support means, said apparatus including a gripper comprising jaws moveable between a protruded position in said path and a retracted position remote from said path, said jaws also being moveable relative to each other to vary their mutual separation when said jaws are in said path, first gripper actuating means operable to move the jaws between their protruded position and their retracted position; second gripper actuating means operable to move the jaws towards and away from one another; a temperature sensing probe selectively moveable between a protruded position to penetrate a food product gripped between the jaws and a retracted position spaced from the food product; and probe operating means operable to move the probe between its protruded position and its retracted position; and
   means to permit said support means to continue moving along said path while said food product is gripped between said jaws.

13. A system as defined in claim 12 wherein said conveyor includes a monorail and wherein said support means is in the form of at least one arm pivotally mounted to said monorail and depending therefrom, said at least one arm being moveable with said monorail, said at least one arm suspending said food product and pivoting with respect to said monorail when said food is gripped by said jaws to allow said at least one arm to continue moving while said food product is held between said jaws.

14. A system as defined in claim 12 wherein said apparatus is moveable along a guide and includes drive means for moving said apparatus along said guide in a direction parallel to said path while said food product is gripped by said jaws to permit said support means to continue moving.

* * * * *